(12) United States Patent
Deleris et al.

(10) Patent No.: US 8,897,929 B2
(45) Date of Patent: Nov. 25, 2014

(54) METHOD AND DEVICE FOR PROTECTING SOFTWARE COMMANDS IN AN AIRCRAFT COCKPIT

(75) Inventors: Yannick Deleris, Gernade (FR);
Adrienne Tankeu Choitat, Toulouse (FR); Sofyan Su, Toulouse (FR)

(73) Assignee: AIRBUS Operations S.A.S., Toulouse (FR)

( * ) Notice: Subject to any disclaimer, the term of this patent is extended or adjusted under 35 U.S.C. 154(b) by 533 days.

(21) Appl. No.: 13/187,920

(22) Filed: Jul. 21, 2011

(65) Prior Publication Data

US 2012/0022720 A1 Jan. 26, 2012

(30) Foreign Application Priority Data

Jul. 22, 2010 (FR) ...................................... 10 56007

(51) Int. Cl.
| | | |
|---|---|---|
| *G01C 23/00* | (2006.01) | |
| *G06F 3/048* | (2013.01) | |
| *G06F 19/00* | (2011.01) | |
| *G06F 3/0488* | (2013.01) | |
| *G06F 3/0489* | (2013.01) | |

(52) U.S. Cl.
CPC ............ *G06F 3/0489* (2013.01); *G06F 3/0488* (2013.01)
USPC .................. 701/3; 701/24; 701/102; 715/835; 715/840; 715/859; 715/861

(58) Field of Classification Search
USPC ........ 701/3, 24, 102; 715/835–840, 859–861; 345/861
See application file for complete search history.

(56) References Cited

U.S. PATENT DOCUMENTS

| | | |
|---|---|---|
| 2002/0089552 A1 | 7/2002 | Wasko et al. |
| 2005/0091614 A1 | 4/2005 | Wasko et al. |
| 2006/0265672 A1 | 11/2006 | Shiono et al. |
| 2010/0281415 A1 | 11/2010 | Wasko et al. |

FOREIGN PATENT DOCUMENTS

| | | |
|---|---|---|
| EP | 1 450 248 A1 | 8/2004 |
| EP | 1 724 667 A2 | 11/2006 |
| FR | 2 911 409 | 7/2008 |
| WO | WO 02/054213 A1 | 7/2002 |

OTHER PUBLICATIONS

French Preliminary Search Report issued Apr. 4, 2011, in French 1056007, filed Jul. 22, 2010 (with English Translation of Category of Cited Documents).

*Primary Examiner* — James Trammell
*Assistant Examiner* — Majdi Alsomiri
(74) *Attorney, Agent, or Firm* — Oblon, Spivak, McClelland, Maier & Neustadt, L.L.P.

(57) ABSTRACT

The invention in particular has as an object the control of execution of software commands of a data-processing system in an aircraft cockpit comprising means for allowing a user to call up these commands. For these purposes, the means making it possible to call up these commands initially are locked in order to block calls to software commands. At the time of reception of an information item for unlocking these means, they are unlocked and the software commands may be called up. The software commands may be called up via the call-up means only if these means are in an unlocked state.

20 Claims, 6 Drawing Sheets

METHOD AND DEVICE FOR PROTECTING SOFTWARE COMMANDS IN AN AIRCRAFT COCKPIT

CROSS-REFERENCE TO RELATED APPLICATIONS

The present application is based upon and claims the benefit of priority from French Patent Application No. 1056007, filed Jul. 22, 2010, the entire contents of which are incorporated herein by reference.

BACKGROUND OF INVENTION

1. Field of Invention

This invention relates to the software interfaces in data processing systems and more particularly to a method and a device for protecting software commands in an aircraft cockpit, in order to control the execution of software commands through a display and control system.

2. Description of Related Art

Avionic display systems, also called CDS (abbreviation for Control and Display System in English terminology) have evolved extensively in their functionalities during recent years. Whereas at the outset they consisted of simple display systems, today they allow an interactivity with the crew in particular by enabling crew members to carry out control and command operations on the avionic systems through data capture and selection means such as a keyboard and a trackball-type pointing device.

FIG. 1 schematically illustrates the architecture of a hardware configuration for control and display in an aircraft cockpit. As illustrated, hardware configure 100 comprises at least one computer 105 accommodating a server for management of display of graphical objects (CDS) connected to an avionic system 110 comprising avionic applications referred to as client applications, at least one screen 115, for example an LCD (abbreviation for Liquid Crystal Display in English terminology) screen, and, in particular if this screen is not sensitive, data capture and selection means 120, also called KCCU (abbreviation for Keyboard and Cursor Control Unit in English terminology). Data capture and selection means 120 are, for example, connected to CDS 105 via a private network 125 that may be of CAN (abbreviation for Controller Area Network in English terminology) type.

Avionic system 110 executes, for example, applications such as engine management applications or fuel management applications the parameters of which may be displayed and/or modified by the crew members. These parameters thus may be transmitted to CDS 105, in charge of displaying them on screen 115. If the pilot wishes to modify a value or activate an element, he selects same and, if need be, modifies it via data capture and selection means 120. This modified value then is transmitted by the CDS to the avionic system which then is able to use it. The CDS thus may be regarded as a resource for display of data originating from the avionics. The CDS and the avionics exchange information items in order to update displayed elements and notify the crew members of events.

Nevertheless, since certain commands affected by these actions may have particularly significant effects for management of the aircraft, it may be necessary to use mechanisms for protection against untimely pressing of the physical command buttons by members of the crew, as is found today.

In fact, for example, the command devices, on the overhead panel of cockpits, the actions of which are irreversible or significant for operation of the aircraft are protected by a colored cover called guard. These protections require the crew members to perform at least two actions in order to carry out the intended command (lift up the guard and press the button).

FIG. 2 schematically illustrates a part of an overhead panel of an aircraft cockpit comprising systems command buttons, some of which are provided with a guard. The guards make access to these buttons more secure and indicate to the crew the significance of the action to be performed. In this way, in order to press a button, it is necessary first of all to lift up the guard.

Part 200 of an aircraft overhead panel shown here comprises a first zone 205-1 linked to management of engine fire extinguishing and a second zone 205-2 linked to management of hydraulic resources. The first zone comprises in particular a button 225 associated with an auxiliary power unit (APU, abbreviation for Auxiliary Power Unit in English terminology). Since this button is situated behind a guard 210, it is not directly accessible and cannot be manipulated by mistake. Guard 210 comprises a hinge 215 on one side and, on an opposite side, a lug 220 making it possible to lift it up so as to reach button 225 situated underneath in order to activate the corresponding command. Moreover, such a button typically comprises lighting means to warn the pilot about the command to be selected.

Thus, typically, when a fire alarm affecting the auxiliary power unit is generated and a function for shutting down this unit is activated, button 225 situated underneath guard 210 lights up. The pilot then may lift up guard 210 and press this button to cut off the fuel supply of the auxiliary power unit and shut it down.

BRIEF SUMMARY OF THE INVENTION

The invention makes it possible to resolve at least one of the problems set forth above. In particular it has as an object a method and a device for protecting against untimely selections of software commands, in an aircraft cockpit, accessible via a man/machine interface (MMI). The invention applies in particular to software commands accessible via a touch screen or a simple screen combined with data capture and selection means of keyboard and mouse type.

The invention thus has as an object a method for protecting at least one software command of a data processing system in an aircraft cockpit, the said data processing system comprising means to allow a user to call up the said at least one software command, this method comprising the following steps, locking the said means for call-up of the said at least one software command in order to block call-ups to the said at least one software command;

receiving an information item for unlocking the said means for call-up of the said at least one software command; and, in response to the said receiving of the said unlocking information item, unlocking the said means for call-up of the said at least one software command, the said at least one software command being able to be called up via the said means for call-up of the said at least one software command only if the said means for call-up of the said at least one software command is in an unlocked state.

The method according to the invention thus makes it possible to offer a software command interface robust in the face of possible interaction errors of the crew using, for example, a keyboard, a mouse or a touch screen. Such a method is generic; it may be used to control all the systems of an aircraft, as recommendation or implementation.

Advantageously, the method further comprises a step of locking the said means for call-up of the said at least one software command, following the said step of receiving an unlocking information item, in the absence of call-up of a protected software command within a predetermined time limit.

In this way, if after having unlocked the means for call-up of the said at least one software command, some protected software command is not called up within a given time, the call-up means automatically are locked so as to avoid possible interaction errors later on by the crew using, for example, a keyboard, a mouse or a touch screen.

Alternatively, the method further comprises a step of locking the said means for call-up of the said at least one software command, following the said step of receiving an unlocking information item, in the absence of call-up of the said at least one software command within a predetermined time limit.

In this way, if after having unlocked the means for call-up of the said at least one software command, the latter is not called up within a given time, the call-up means automatically are locked so as to avoid possible interaction errors later on by the crew using, for example, a keyboard, a mouse or a touch screen. Locking thus is linked to the command that should have been called up.

According to a specific embodiment, the method further comprises a step of receiving a locking information item, a step of locking the said means for call-up of the said at least one software command being carried out in response to the said receiving of the said locking information item. In this way a crew member may control locking of the call means of the said at least one software command particularly if, after having unlocked them, he decides not to call up this software command, so as to avoid possible interaction errors later on by the crew using, for example, a keyboard, a mouse or a touch screen.

Still according to a specific embodiment, the method further comprises a step of verifying at least one predetermined rule, the said step of unlocking the said means for call-up of the said at least one software command being carried out in response to the said step of verifying. In this way, the method makes it possible to unlock means for call-up of the said at least one software command in selective manner, for example according to the configuration of the aircraft, a specific event, the level of criticality of the intended software command and/or the flight phase of the aircraft. Such a rule may be dependent in particular on a characteristic of the said at least one software command and/or the configuration of a device comprising the said data processing system.

Advantageously, the method further comprises a step of calling up the said at least one software command, the said step of calling up being carried out following execution of the said step of unlocking the said means for call-up of the said at least one software command and receiving an information item for selection of the said call-up means, the said information item for selection of the said call-up means and the said unlocking information item being received from separate means. In this way the method according to the invention makes it possible to safeguard the interface for call-up of software commands by using segregated paths for unlocking and for call-up of software commands.

The said means for call-up of the said at least one software command preferably comprise graphical elements shown on a screen and means for selection of the said graphical elements.

The invention also has as an object a computer program comprising instructions adapted for the implementation of each of the steps of the method described above when the said program is run on a computer, a device comprising means adapted for the implementation of each of the steps described above as well as an aircraft comprising such a device.

The advantages obtained with this computer program, this device and this aircraft are similar to those mentioned above.

BRIEF DESCRIPTION OF THE SEVERAL VIEWS OF THE DRAWINGS

Other advantages, purposes and characteristics of this invention become apparent from the detailed description that follows, presented by way of non-limitative example, with reference to the attached drawings in which.

DETAILED DESCRIPTION OF THE INVENTION

In order to protect the means for call-up of software commands, for example graphical elements displayed on a screen and accessible via this screen or from separate data capture and selection means, in a secured environment such as an aircraft cockpit, the invention uses a software guard function and unlocking means that may be physical or software.

The guard function has as an object in particular to list graphical elements for call-up of software commands originating from client applications as well as to handle the locking and unlocking of these graphical elements, preferably according to predefined rules.

An unlocking command, here called Unlock CP, may be used by the crew to inform the guard function of its need to interact with the graphical elements for call-up of software commands, that is to say to make these graphical elements active.

The guard function may be integrated into a display system, in particular a CDS-type display system or into a system comprising client applications executing the functions associated with the software commands concerned here. It also may be independent, distributed in several systems or be partially independent.

FIG. 3, comprising FIGS. 3a, 3b, 3c and 3d, schematically illustrates the architecture of a hardware configuration for control and display in an aircraft cockpit, in accordance with the invention, according to several forms of implementation of a guard function.

Figure 1:
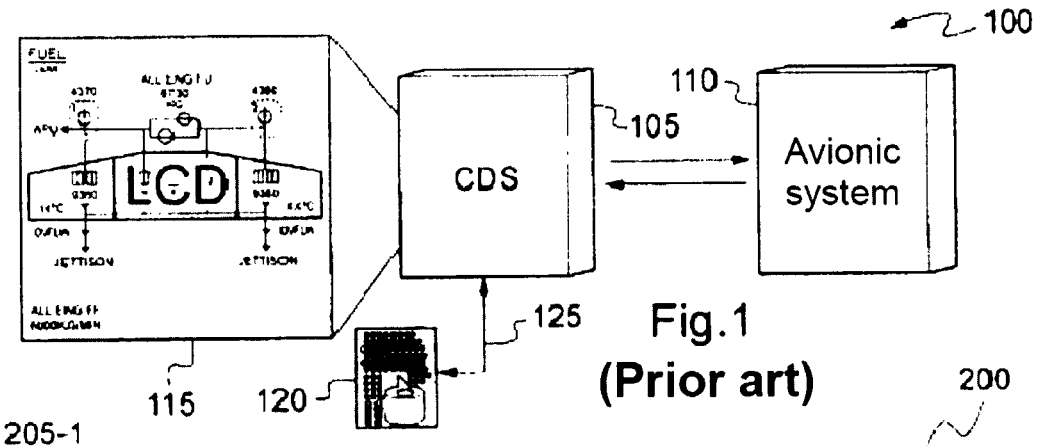
FIG. 1 schematically illustrates the architecture of a hardware configuration for control and display in an aircraft cockpit.
Figure 2:
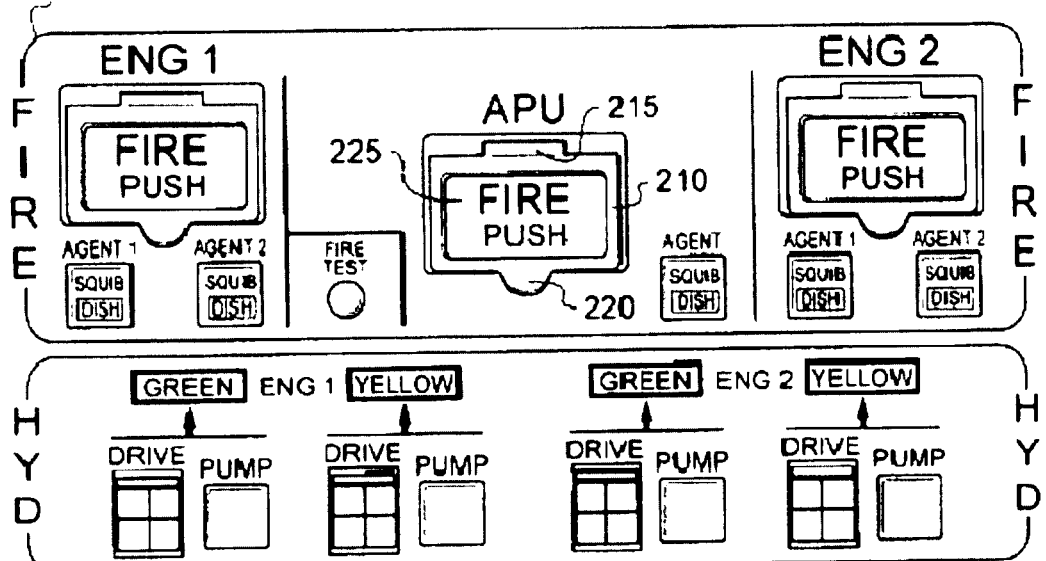
FIG. 2 schematically illustrates a part of an overhead panel of an aircraft cockpit comprising systems command buttons, some of which are provided with a guard.
Figure 3A:
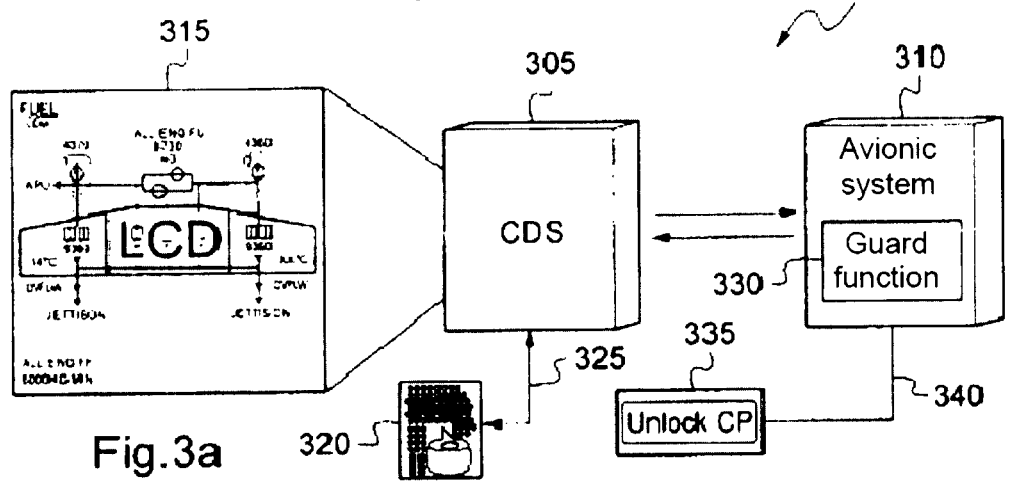
FIG. 3, comprising FIGS. 3a to 3d, schematically illustrates the architecture of a hardware configuration for control and display in an aircraft cockpit, in accordance with the invention, according to several forms of implementation of a guard function.

As illustrated on FIG. 3a, hardware configuration 300 comprises at least one computer 305 accommodating a server for management of display of graphical objects (CDS) connected to at least one avionic system 310 comprising avionic applications referred to as client applications, at least one screen 315 such as an LCD screen and, particularly if this screen is not sensitive, means for data capture and selection (KCCU) 320 via, for example, a CAN-type bus 325. Avionic system 310, to which an "Unlock CP" button 335 here is connected via a wired link that may be discrete 340, comprises, in this embodiment, a guard function 330.

Like avionic system 110 described above, avionic system 310 runs applications such as engine management applications or fuel management applications. Besides parameters of these applications, graphical elements making it possible to call up software commands associated with these applications may be transmitted to the CDS to be displayed on screen 315.

Nevertheless, the guard function, implemented in avionic system 310, deactivates (or locks) these graphical elements so that the mere selection thereof does not call up the associated software commands if "Unlock CP" button 335 has not been pressed beforehand. Advantageously, "Unlock CP" button 335 should be pressed within a predetermined time limit before selection of a graphical element so that this selection calls up the associated software command.

As illustrated on FIG. 3a, guard function 330 here is specific to avionic system 310. Consequently, guard function 330 does not interact with other avionic systems (not shown) connected to CDS 305. In other words, the guard function shown on 3a is intended for the protection of graphical elements for call-up of software commands specific to a particular system.

Figure 3B:
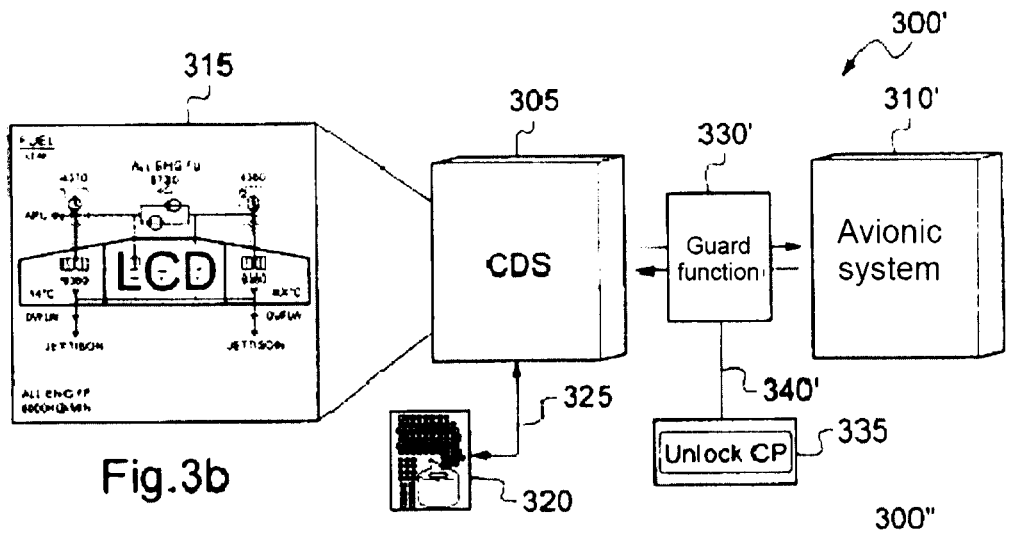

According to a second embodiment, illustrated on FIG. 3b, hardware configuration 300' comprises at least one computer 305 accommodating a server for management of display of graphical objects connected to at least one avionic system 310' comprising client avionic applications, via a guard function 330', at least one screen 315 such as an LCD screen and, in particular if this screen is not sensitive, means for data capture and selection 320 via, for example, a CAN-type bus 325. Guard function 330' here is linked to "Unlock CP" button 335 via a link, for example discrete, 340'.

Like avionic system 310 described above, avionic system 310' runs applications such as engine management applications or fuel management applications. Again, besides parameters of these applications, graphical elements making it possible to call up software commands associated with these applications may be transmitted to the CDS to be displayed on screen 315.

Nevertheless, the guard function, implemented between avionic system 310' and CDS 305, locks these graphical elements so that the mere selection thereof does not call up the associated software commands if "Unlock CP" button 335 has not been pressed beforehand. "Unlock CP" button 335 preferably should be pressed within a predetermined time limit before selection of a graphical element so that this selection calls up the associated software command.

It is noted that guard function 330' here may be specific to avionic system 310' common to certain avionic systems connected to CDS 305, including avionic system 310', or common to all the avionic systems connected to CDS 305.

Figure 3C:
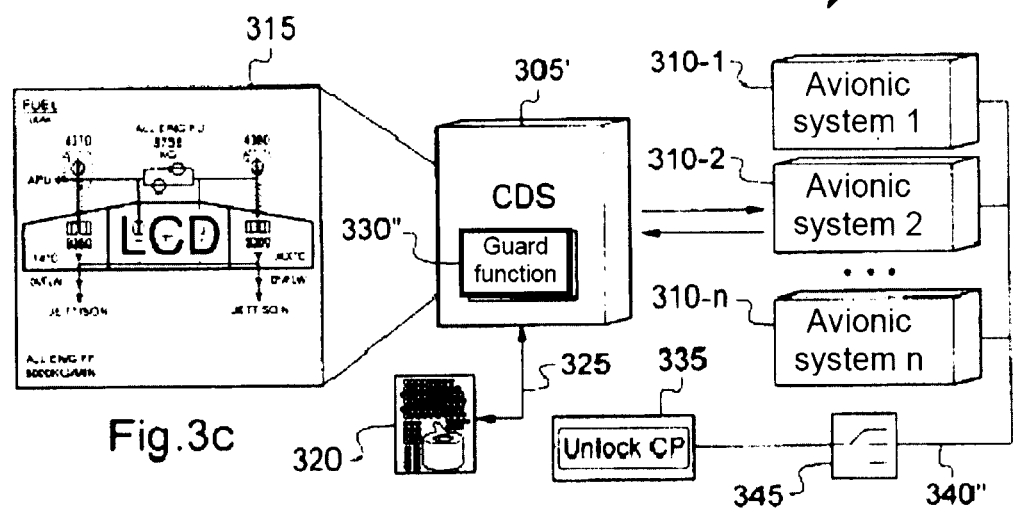

According to a third embodiment, illustrated on FIG. 3c, hardware configuration 300" comprises at least one computer 305', accommodating a server for management of display of graphical objects as well as a guard function 330", connected to avionic systems 310-1 to 310-n comprising client avionic applications, at least one screen 315 such as an LCD screen and, in particular if this screen is not sensitive, means for data capture and selection 320 via, for example, a CAN-type bus 325. Avionic systems 310-1 to 310-n here are linked to "Unlock CP" button 335 via, for example, a discrete link 340" and a switch 345.

Like avionic systems 310 and 310' described above, avionic systems 310-1 to 310-n run applications such as engine management applications and fuel management applications. Again, besides parameters of these applications, graphical elements making it possible to call up software commands associated with these applications may be transmitted to the CDS to be displayed on screen 315.

Nevertheless, guard function 330", implemented in CDS 305', locks these graphical elements so that the mere selection thereof does not call up the associated software commands if "Unlock CP" button 335 has not been pressed beforehand. "Unlock CP" button 335 preferably should be pressed within a predetermined time limit before selection of a graphical element so that this selection calls up the associated software command.

It is noted that guard function 330' here is common to all the avionic systems connected to CDS 305. Such an embodiment is particularly adapted to the case of display of a page containing graphical elements making it possible to call up software commands from several avionic systems. Actually, it is simpler to use a single guard function at the CDS which centralizes all the information items than to multiply these functions.

Although several "Unlock CP" buttons may be used, the use of a switch makes it possible to transmit the unlocking event to the system corresponding to the graphical element selected and, in particular, to reduce the surface area occupied by the buttons as well as to limit the connection complexity of these buttons.

Figure 3D:
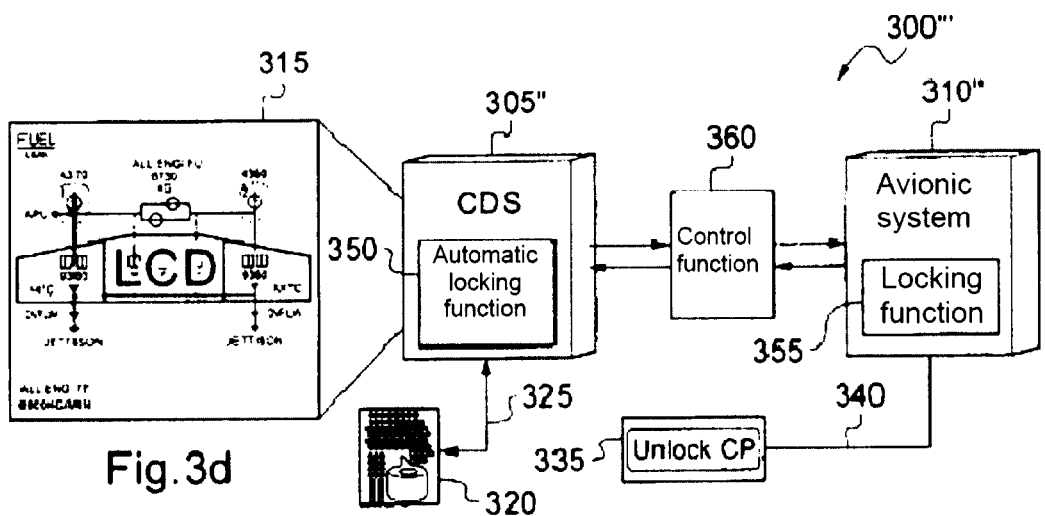

According to a fourth embodiment, illustrated on FIG. 3d, hardware configuration 300'" comprises at least one computer 305", accommodating a server for management of display of graphical objects as well as an automatic locking function 350, connected to at least one avionic system 310" comprising client avionic applications and a locking function 355, via a control function 360, at least one screen 315 such as an LCD screen and, in particular if this screen is not sensitive, means for data capture and selection 320 via, for example, a CAN-type bus 325. Avionic system 310" here is linked to "Unlock CP" button 335 via, for example, discrete link 340.

In this way, the guard function is distributed in automatic locking function 350, locking function 355 and control function 360.

Like avionic systems 310, 310' and 310-1 to 310-n described above, avionic system 310" runs applications such as engine management applications and fuel management applications. Again, besides parameters of these applications, graphical elements making it possible to call up software commands associated with these applications may be transmitted to the CDS to be displayed on screen 315.

Nevertheless, the guard function implemented through automatic locking function 350, locking function 355 and control function 360 locks these graphical elements so that the mere selection thereof does not call up the associated software commands if "Unlock CP" button 335 has not been pressed beforehand. "Unlock CP" button 335 preferably should be pressed within a predetermined time limit before selection of a graphical element so that this selection calls up the associated software command.

More precisely, automatic locking function 350 here automatically locks the displayed graphical elements after a predetermined time counting from pressing of the "Unlock PC" button, locking function 355 locks the graphical elements to be displayed and control function 360 verifies that CDS 305" and the applications run by avionic systems 310" are transmitting coherent orders.

In this way, the guard function may provide a dual-level protection to the software commands, depending on its form of implementation. It may be associated with a specific system in order to protect the software commands associated with this system or be associated with all the systems (or with several systems) in order to protect all the software commands of these systems.

The guard function advantageously may be able to be parameterized so that the software commands are accessible or not accessible and locked or not locked, for example according to the configuration of the aircraft, its flight phase and/or the criticality of the systems or systems to be protected. This parameterization here is accomplished by application of the rules that may be defined for each software command.

Moreover, according to the criticality of the software commands that may be called up and/or of the avionic systems considered, it may be necessary to multiply the safety measures by requiring, for example, several pressings on the unlocking button.

The criticality level may be defined in particular by the standard DO-178B which establishes the level of development of the software and hardware of avionic systems. According to this standard, a level A corresponds to systems that may have a catastrophic problem, a level B to those that may have a dangerous problem, a level C to those that may have a major problem, a level D to those that may have a minor problem while a level E applies to those without any effect on safety.

Figure 4:
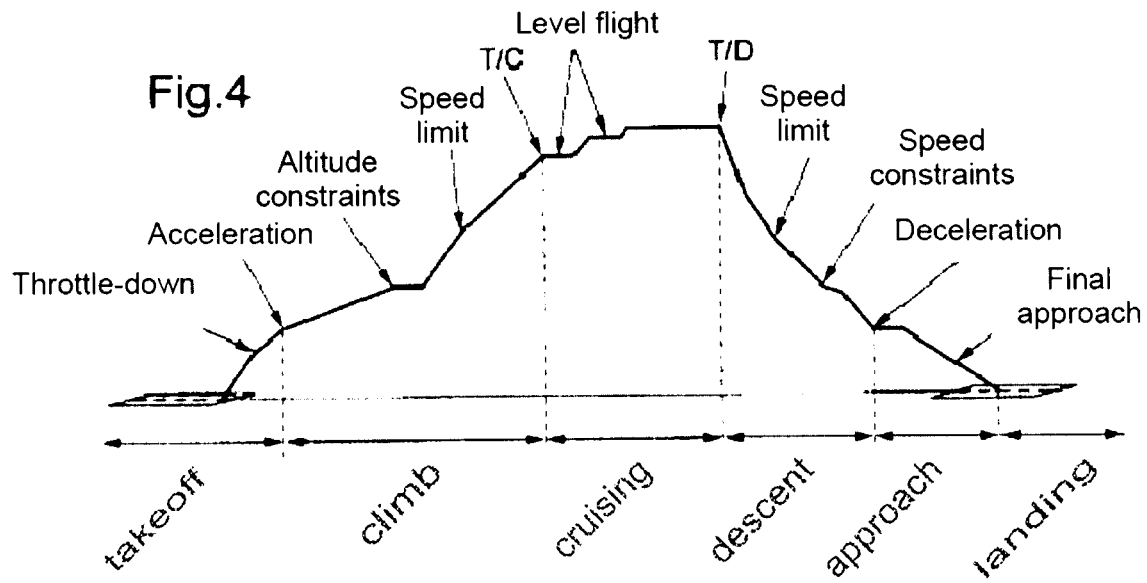
FIG. 4 schematically illustrates a flight plan of an aircraft and associates a flight phase with each segment of the flight plan.

Furthermore, the flight phase of an aircraft is defined according to its flight plan. FIG. 4 schematically illustrates a flight plan of an aircraft and associates a flight phase with each segment of the flight plan. A takeoff phase, a climb phase, a cruising phase, a descent phase, an approach phase and a landing phase thus are defined.

In order to improve protection of the software commands, it also is possible to multiply the number of actions to be performed in order to call up a software command. Thus, for example, a software command having a low operational impact level may be called up as soon as the corresponding graphical element is selected, while a software command having a medium operational impact level may be called up as soon as the corresponding graphical element is selected after the "Unlock CP" button has been pressed once, and a software command having a high operational impact level may be called up as soon as the corresponding graphical element is selected after the "Unlock CP" button has been pressed twice.

The operational impact level of a software command may be defined according to the criticality level of the associated avionic system. By way of illustration, the operational impact level of a software command may be equal to one if the criticality level of the corresponding avionic system is equal to E, D or C, to two if the criticality level of the corresponding avionic system is equal to B and to three if the criticality level of the corresponding avionic system is equal to A. According to this example, the operational impact level of a software command defines the number of actions to be performed in order to launch the corresponding software command.

The rules for unlocking a graphical element for call-up of a software command thus may be expressed as follows:

Unlocking_j(call-up_command_i) if (configuration; phase; criticality_system_i)

where the variable j indicates the number of pressings to be applied on the "Unlock CP" button during a predetermined time period, call-up_command_i designates a graphical element making it possible to call up the software command i, configuration concerns a list of elements of the aircraft and their state, phase designates the flight phase and criticality_system_i designates the criticality level of the system that is to execute the command i that may be called up.

Each parameter may be expressed in the form of logical combinations of variables.

By way of illustration, the following rule may be linked to the software command for cut-off of an engine, Unlocking_2(cut-off_engine) if (engine_1 OR engine_2; climb OR cruising OR descent OR landing; C OR D)

Thus, according to this example, an engine may be shut down if two pressings are applied on the "Unlock CP" button during a predetermined time period and if at least one of the engines engine_1 and engine_2 is functioning normally, the aircraft is in climb, cruising, descent or landing phase and if the criticality level of the application calling up this command is equal to C or D.

Similarly, the following rule imposes disabling of computer X in order to allow unlocking of commands a, b and c.

Unlocking_1(a, b, c) if (NO(computer_X))

Figure 5:
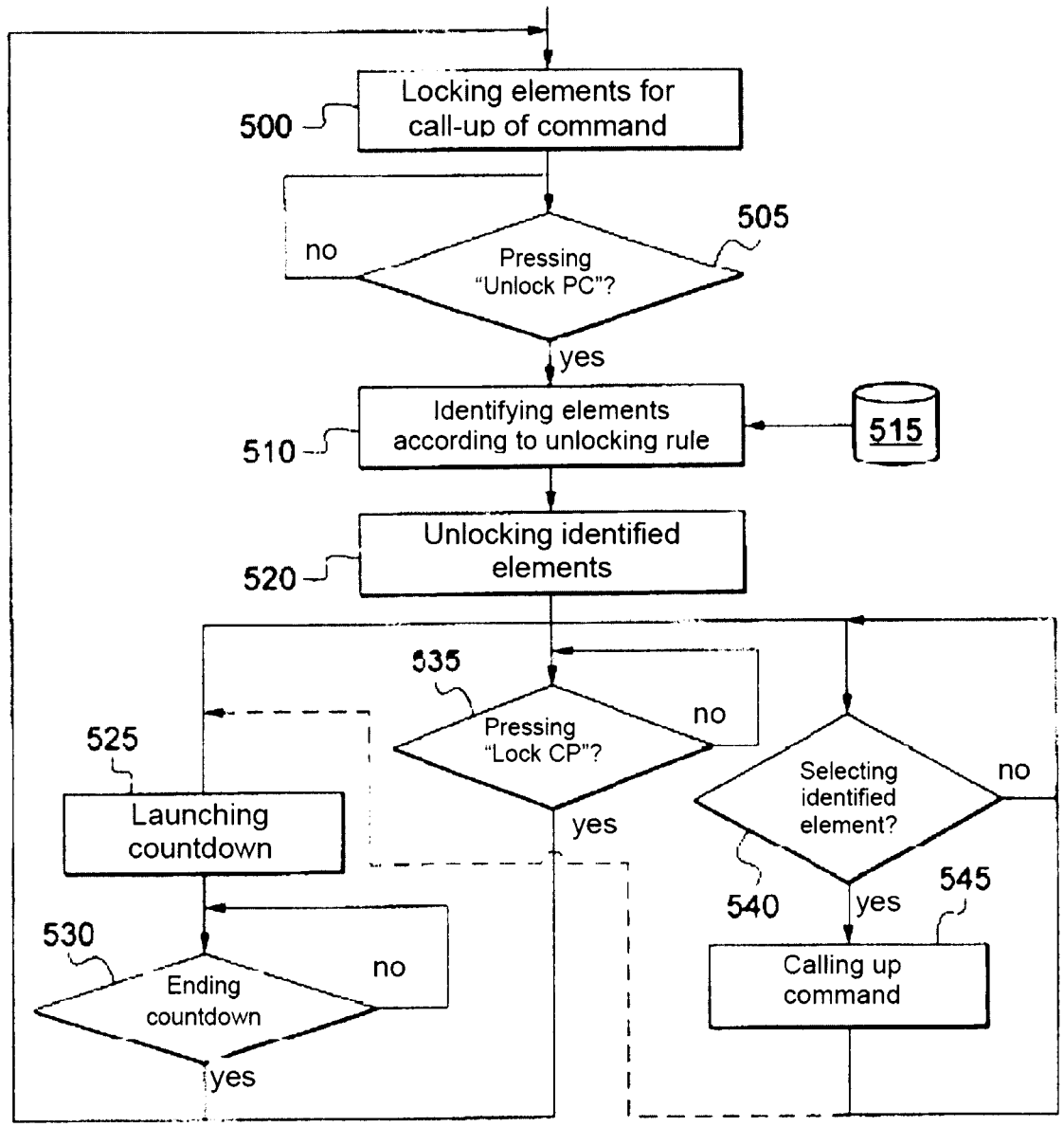
FIG. 5 illustrates certain steps of a guard function for making access to software commands more secure.

FIG. 5 illustrates certain steps of a guard function for making access to software commands more secure.

During a first step (step 500), the graphical elements to be displayed and allowing call-up of software commands are identified and locked so that the selection of one of them does not call up the corresponding software command. These graphical elements are, for example, virtual buttons to be displayed on a screen, of pushbutton, checkbutton or togglebutton type.

A test then is performed in order to determine whether the "Unlock CP" button has been pressed (step 505). If not, the algorithm loops around until it is ended or until another page is to be displayed.

If, on the contrary, a pressing of the "Unlock CP" button has been detected, the graphical elements to be unlocked are identified (step 510). As described above, this identification preferably is made according to predetermined rules linked, in particular, to the situation of the aircraft, its configuration, its flight phase and/or the criticality of the system or systems executing the software command considered. These rules here are stored in database 515.

The identified graphical elements then are unlocked so that they may be selected and call up software commands (step 520).

A countdown, defining a predetermined time period, then is launched (step 525) and a test is performed to detect the end of the countdown (step 530). At the end of the countdown, the algorithm returns to the first step in order to lock all the displayed graphical elements for call-up of software commands.

In the same way, if there is a button for locking graphical elements for call-up of software commands ("Lock CP" button), a test is performed to detect a pressing of this button (step 535). Such a button makes it possible to inhibit a prior pressing applied on the "Unlock CP" button, for example following an error in judgment, or if the pilot has finished interacting with the software command elements and voluntarily wishes to relock them. If a pressing of the button for locking the graphical elements for call-up of software commands is detected, the algorithm returns to the first step in order to lock all the displayed graphical elements for call-up of software commands.

Still in the same way, a test is performed in order to determine whether a graphical element previously identified and unlocked is selected (step 540). If so, the software command corresponding to the graphical element selected is called up (step 545). The algorithm then returns to the preceding step in order, if need be, to detect a new selection of a graphical element identified and unlocked.

As described above, the algorithm returns to the first step in order to lock all the displayed graphical elements for call-up of software commands at the end of the countdown or when a pressing of the button for locking the graphical elements for call-up of software commands is detected.

According to another embodiment, illustrated on FIG. 5 by the dotted-line arrow, the countdown is reinitialized each time a crew member selects a graphical element for software command call-up so as to allow the crew to link together command call-up sequences without requiring numerous pressings of the "Unlock CP" button.

It is seen here that the selection of graphical elements previously locked and not unlocked does not entail any call-up to the associated software commands.

By way of illustration, the invention may be implemented in systems interacting in accordance with the ARINC standard 661 (ARINC is a trade name) which may be used to manage interactive screens.

ARINC standard 661 here defines the interface between the CDS and the avionic systems offering crew members the possibility of interaction via screens.

It is recalled here that the ARINC 661 standard allows the use of multiple windows, according to the same principle as a home computer. Display zones of a screen, also called layers in English terminology, contain graphical elements, also called widgets in English terminology, making it possible to call up software commands of applications run by avionic systems. Each application here is responsible for the functional management of the interface while the CDS has charge of the display of the graphical elements, their representation and the configuration of the display zones.

Typically, the CDS gives notice of an external event linked to a graphical element, such as a selection, to the application to which this graphical element is linked. Likewise, an application indicates to the CDS the updates of parameters of the graphical elements following an internal event (specific to the application) as well as the updates of the display zones.

Figure 6:
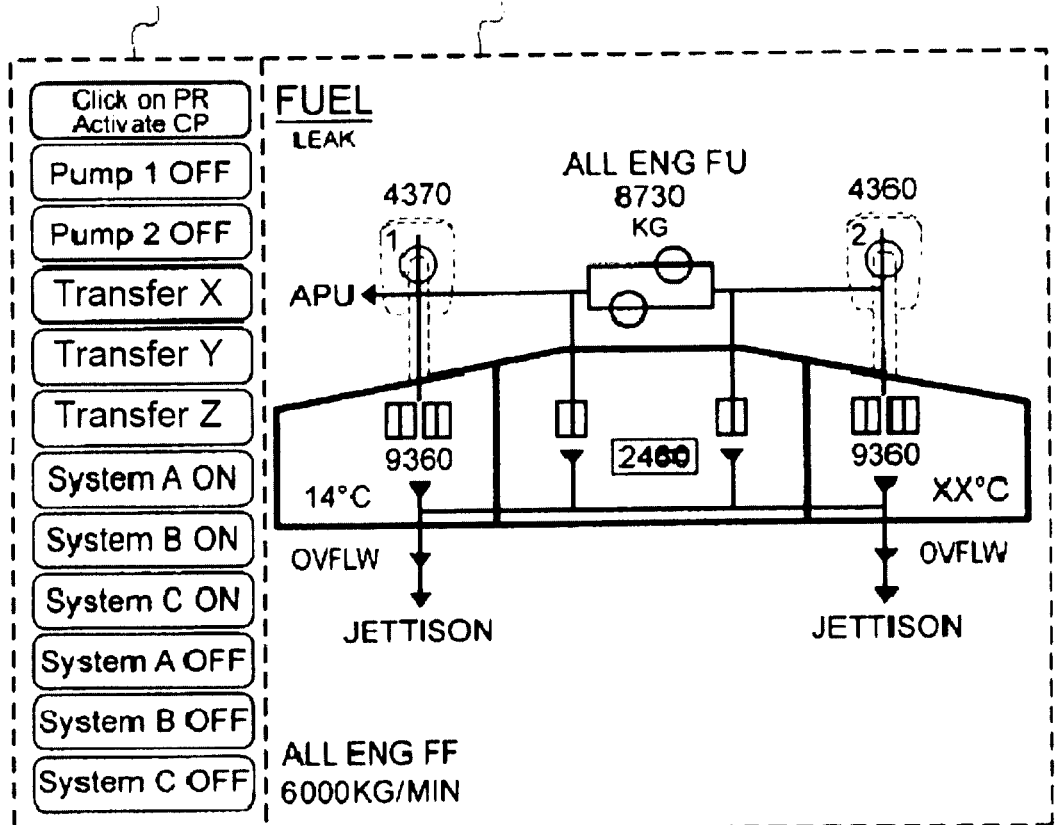
FIG. 6 illustrates an exemplary display zone linked to a fuel management application, comprising active graphical elements and passive graphical elements.

By way of illustration, there is considered here an application for functional management of graphical elements of a fuel management avionic system. A "fuel" display zone here comprises two categories of graphical elements, active graphical elements for call-up of software commands, for example of pushbutton type, making it possible to modify the configuration state of the fuel management system, typically electrovalves, and passive graphical elements for display of parameters of the fuel management system that do not allow interaction with the fuel management system (at most they make it possible to modify the display configuration, that is to say modification of the CDS configuration). FIG. 6 illustrates an exemplary display zone linked to such a fuel management application in which active graphical elements are placed on the left (reference 600) and passive graphical elements are situated on the right (reference 605), separately.

Furthermore, it is considered here that the guard function used is implemented outside the CDS and the fuel management system. The rules for unlocking the (active) graphical elements here are determined only according to the operational impact level associated with the software commands as defined in Table 1 presented herewith, unconditionally. In this example, the operational impact level represents the number of actions to be carried out in order to unlock a graphical element, that is to say the number of pressings to be applied on the "Unlock CP" button plus one.

During a first phase, before creating the display zone of the fuel management system, the CDS informs the application for functional management of graphical elements of the fuel management system and the guard function for this next display, indicating the list of graphical elements to be displayed. This application for functional management of graphical elements of the fuel management system then transmits a request to the guard function to make the indicated graphical elements visible. The guard function then establishes the list of all the graphical elements making it possible to call up software commands, to be protected, which are to be displayed in the display zone.

The guard function then sends to the CDS a notification of locking of the graphical elements so identified. Consequently, when the graphical elements linked to the display zone linked to the fuel management application are displayed, the graphical elements making it possible to call up software commands are locked, with the exception of those having a level one operational impact which require only a single action for calling up the corresponding software command.

During a second phase, in order to interact with the graphical elements making it possible to call up software commands having a level two and higher operational impact, the crew members must use the "Unlock CP" button in order to unlock the graphical elements. At the first pressing of the "Unlock CP" button, the unlocking event is transmitted to the guard function for example via a discrete link or a CAN-type bus if the "Unlock CP" button is a physical button or a network of AFDX (abbreviation for Avionics Full DupleX in English terminology) type if the "Unlock CP" button is a software button.

On reception of this event, the guard function verifies the rules for unlocking graphical elements for call-up of software commands and, if need be, unlocks the graphical elements for call-up of software commands having a level two operational impact. Call-up to these commands thus requires two actions, a pressing on the "Unlock CP" button and selection of the corresponding graphical element.

For the graphical elements for call-up of software commands having a level three operational impact, applying a second pressing on the "Unlock CP" button, or another specific action such as a pressing on another specific button, selection of a particular graphical element or a voice command is necessary, in order to unlock the corresponding graphical elements.

As described above, the crew members may interact with the unlocked graphical elements to call up software commands. In this way, during a third phase, when an unlocked graphical element is selected, a corresponding event is transmitted to the associated application in order to call up the intended software command. In the same way, the guard function monitors the activities of the crew (with regard to selection of graphical elements) in order to verify that the applications always receive command frames.

Again, if the guard function notes an inactivity, that is to say the absence of reception of command frames for a predetermined time, it orders locking of the graphical elements previously unlocked. The crew members also preferably have the option of manually unlocking graphical elements for call-up of software commands with the aid of a dedicated physical or software button. By way of illustration, after one or more successive pressings, the "Unlock CP" button may be converted into a "Lock CP" button.

Figure 7:
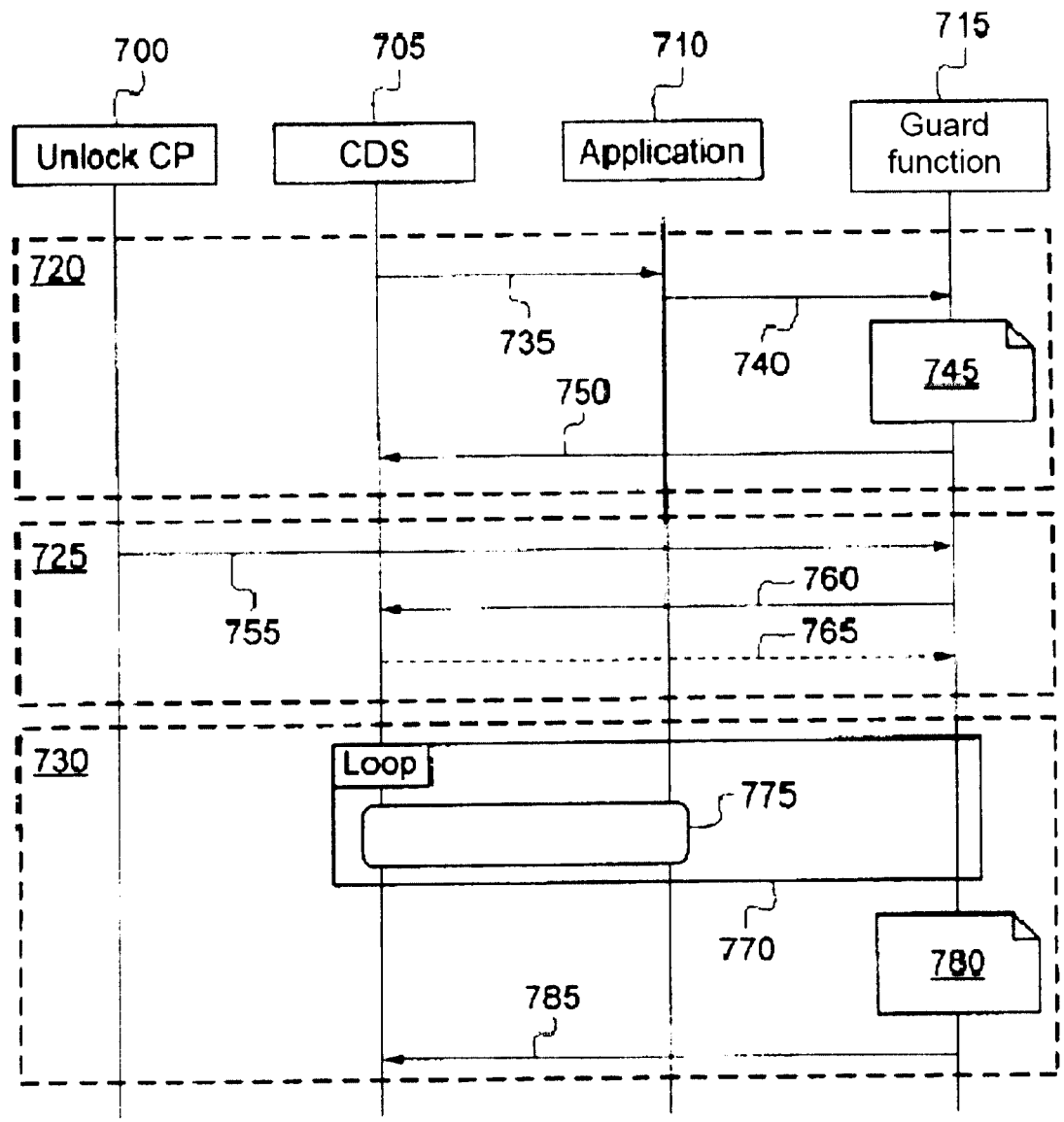
FIG. 7 shows an exemplary sequence diagram for locking and unlocking a graphical element as well as the call-up of a corresponding software command; and, FIG. 8 illustrates an exemplary hardware architecture adapted for implementing certain steps of the invention, in particular steps implemented with a guard function.

These three phases are shown on FIG. 7 which illustrates an exemplary sequence diagram for locking and unlocking of a graphical element as well as call-up of a corresponding software command.

As illustrated, the sequence diagram here concerns exchanges of messages among an "Unlock CP" button 700, a CDS 705, an application 710 allowing execution of a software command and a guard function 715. The sequence diagram is broken down into three phases, a phase 720 for locking graphical elements, a phase 725 for unlocking graphical elements and a phase 730 for call-up of software commands and/or for locking of graphical elements according to a predetermined time limit.

During first phase 720, CDS 705 sends to application 720 a notification of display (735), for example a notification of display of information items relating to the fuel management system and graphical elements making it possible to call up software commands. Application 710 then transmits (740) a command to guard function 715 so that these information items and these graphical elements are made visible.

On reception of this command, guard function 715 analyses (745) the content of the data to be displayed in order to identify the graphical elements making it possible to call up software commands. A locking state is associated with each of these identified graphical elements. Guard function 715 then transmits (750) an instruction to CDS 705 for display of these data, indicating the locking state of the graphical elements concerned.

During second phase 725, after a pressing on "Unlock CP" button 700 has been detected and the event has been transmitted (755) to guard function 715, the latter, after verification according to predetermined rules, sends (760) to CDS 705 an instruction for unlocking of the locked graphical elements verifying the rules. Optionally, a notification of unlocking may be transmitted (765) by CDS 705 to guard function 715.

When graphical elements making it possible to call up software commands are unlocked, they may be selected during third phase 730. After selection of such a graphical element and verification of coherence of the selection by the guard function (770), the corresponding software command is called up and executed by application 710 (775). In the same way, guard function 715 monitors (780) the activity of the crew members with regard to the selection of unlocked graphical elements. If no unlocked graphical element is selected during a predetermined time period, guard function 715 sends an instruction (785) to CDS 705 to lock the graphical elements making it possible to call up previously unlocked software commands.

Advantageously, so as to avoid untimely call-ups of software commands by a CDS, a call-up to a software command is effective only if an unlocking instruction has been transmitted previously by a guard function. The latter therefore is used to verify the coherence of the instructions and of the call-ups of software commands.

It is seen here that if the preceding description applies essentially to the group protection of software commands, it is possible, according to the same principle, to protect the software commands individually. In this way, the locking of a graphical element after a pressing on an "Unlock CP" button may be carried out if, during a predetermined time period, this graphical element has not been selected, irrespective of the selection of other graphical elements. It also is possible to take into account the criticality level of the intended software commands to decide as to the locking of a graphical element according to the selection of the latter and/or of other graphical elements belonging to the same group, that is to say, for example, linked to the same avionic system or functionally linked.

Moreover, if the preceding description relates essentially to the protection of software commands that may be called up by selection of a graphical element on the screen, the method similarly applies to other forms of selection for call-up of software commands, in particular voice call-up of such commands.

Figure 8:
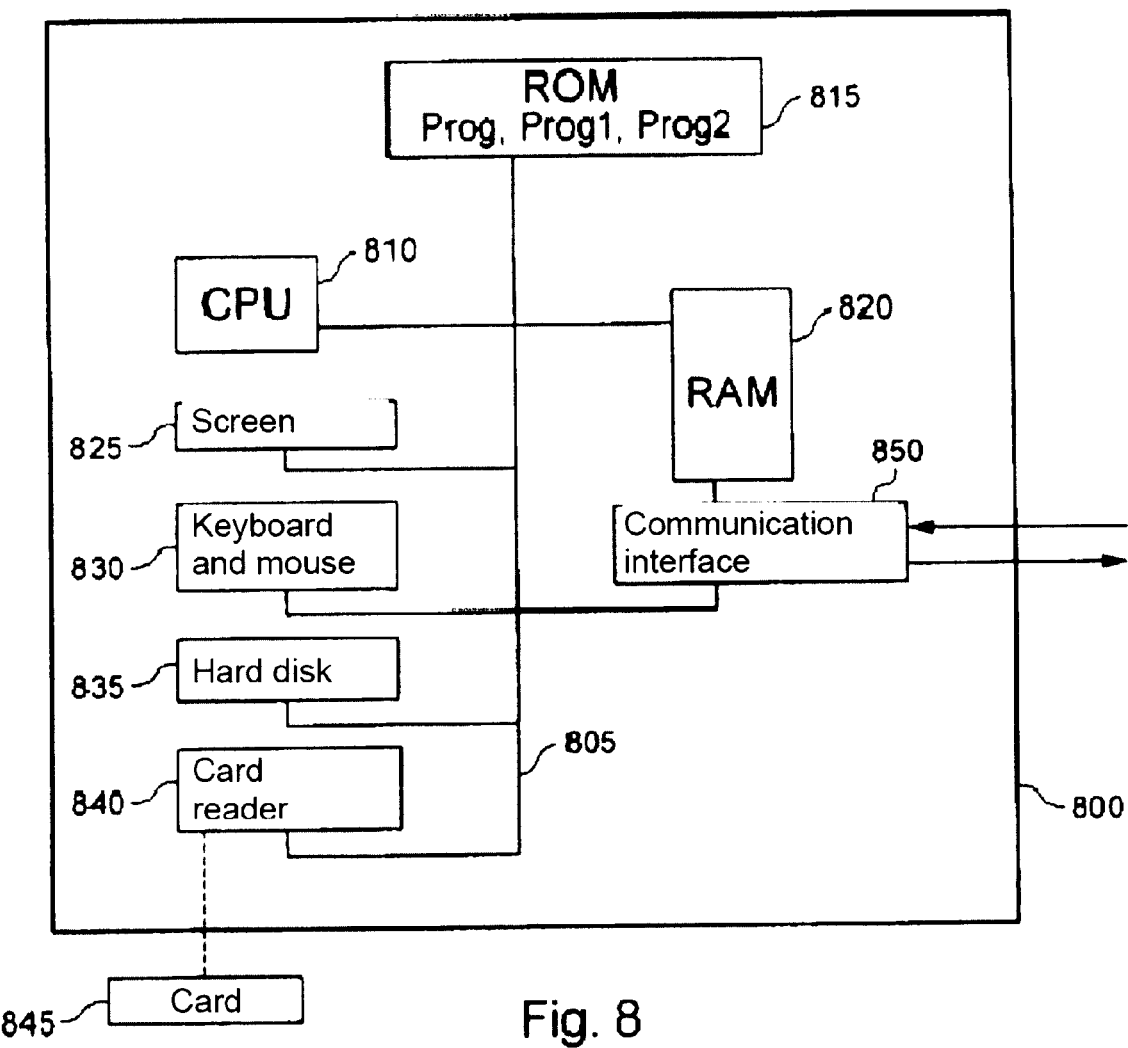

FIG. 8 illustrates an exemplary hardware architecture, for example a server or a computer, adapted for implementing certain steps of the invention, in particular the steps implemented by a guard function. Device 800 here comprises a communication bus 805 to which there are connected:

one or more central processing units or microprocessors 810 (CPU, abbreviation for Central Processing Unit in English terminology);

a read-only memory 815 (ROM, acronym for Read Only Memory in English terminology) able to comprise programs (prog, prog1 and prog2) necessary for implementation of the invention;

a random-access memory or cache memory 820 (RAM, acronym for Random Access Memory in English terminology) comprising registers adapted for recording variables and parameters created and modified in the course of running of the aforesaid programs; and a communication interface 850 adapted for transmitting and receiving data.

Device 800 also preferably has the following elements:

one or more display units 825 making it possible to display data and able to serve as a graphical interface with a user who will be able to interact with programs according to the invention, with the aid of a keyboard and a mouse 830 or another pointing device such as a touch screen or a remote control;

a hard disk 835 able to comprise the aforesaid programs as well as information items processed or to be processed according to the invention; and a memory-card reader 840 adapted for receiving a memory card 845 and reading or writing therein data processed or to be processed according to the invention.

The communication bus permits communication and interoperability among the different elements included in device 800 or connected thereto. The depiction of the bus is not limitative and, in particular, the central unit is capable of communicating instructions to any element of device 800 directly or via another element of device 800.

The executable code of each program allowing the programmable device to implement the processes according to the invention can be stored, for example, on hard disk 835 or in read-only memory 815.

According to one variant, memory card 845 can contain information items, in particular information items to be processed according to the invention, as well as the executable code of the aforesaid programs which, once read by device 800, is stored on hard disk 835.

According to another variant, the executable code of the programs and the information items to be processed according to the invention will be able to be received, at least partially, via interface 850, to be stored in a manner identical to that described above.

More generally, the program or programs as well as the information items to be processed according to the invention will be able to be loaded into one of the storage means of device 800 before being run.

Central unit 810 is going to control and direct the execution of the instructions or portions of software code of the program or programs according to the invention, which instructions are stored on hard disk 835 or in read-only memory 815 or else in the other aforesaid storage elements. During boot-up, the program or programs that are stored in a non-volatile memory, for example hard disk 835 or read-only memory 815, are transferred to random-access memory 820 which then contains the executable code of the program or programs according to the invention, as well as registers for storing the variables and parameters necessary for implementation of the invention.

Naturally, to satisfy specific needs, an individual competent in the field of the invention will be able to apply modifications in the foregoing description.

ANNEX

TABLE 1

| OBJECTIVE | Operational impact level |
|---|---|
| Pump 1 OFF | 3 |
| Pump 2 OFF | 3 |
| Transfer X | 2 |
| Transfer Y | 2 |
| Transfer Z | 2 |
| System A ON | 1 |
| System B ON | 1 |
| System C ON | 1 |
| System A OFF | 1 |
| System B OFF | 1 |
| System C OFF | 1 |

The invention claimed is:

1. A method for protecting at least one software command of a data processing system of an aircraft cockpit, said data-processing system comprising a call-up mechanism allowing a user to call up said at least one software command, this method comprising:
   locking said call-up mechanism in order to block the call up mechanism from sending a call to initiate the at least one software command;
   receiving in the data processing system an information item for unlocking said call-up mechanism of said at least one software command;
   verifying in the data processing system at least one predetermined rule, said at least one predetermined rule being dependent on a characteristic of said at least one software command and/or a configuration of a device which includes the data processing system; and
   in response to said receiving of said information item for unlocking and said step of verifying, unlocking said call-up mechanism such that said at least one software command is able to be called up via said call-up mechanism of said at least one software command only if said call-up mechanism is in an unlocked state.

2. The method according to claim 1, further comprising locking said call-up mechanism, following said receiving an information item for unlocking, in the absence of call-up of a protected software command within a predetermined time limit.

3. The method according to claim 2, further comprising receiving an information item for locking, wherein locking said call-up mechanism being carried out in response to said receiving of said information item for locking.

4. The method according to claim 2, further comprising calling up said at least one software command, said calling up being carried out following execution of said locking said call-up mechanism and receiving an information item for selection of said call-up mechanism, said information item for selection of said call-up mechanism and said information item for unlocking being received from separate portions of the data processing system.

5. The method according to claim 2, said call-up mechanism of said at least one software command comprising graphical elements shown on a screen and a selection mechanism of said graphical elements.

6. A computer program comprising instructions adapted to cause a computer to implement the method according to claim 2 when said program is run on said computer.

7. A device comprising a processor adapted to perform the method according to claim 2.

8. The method according to claim 1, further comprising locking said call-up mechanism, following said receiving an information item for unlocking, in the absence of call-up of said at least one software command within a predetermined time limit.

9. The method according to claim 8, further comprising receiving an information item for locking, wherein said call-up mechanism being carried out in response to said receiving of said information item for locking.

10. The method according to claim 8, further comprising calling up said at least one software command, said calling up being carried out following execution of said locking said call-up mechanism and receiving an information item for selection of said call-up mechanism, said information item for selection of said call-up mechanism and said information item for unlocking being received from separate portions of the data processing system.

11. The method according to claim 8, said means for call-up mechanism of said at least one software command comprising graphical elements shown on a screen and means for a selection mechanism of said graphical elements.

12. A computer program comprising instructions to cause a computer to implement the method according to claim 8 when the said program is run on said computer.

13. A device comprising a processor adapted to perform the steps of the method according to claim 8.

14. An aircraft comprising the device according to claim 13.

15. The method according to claim 1, further comprising receiving an information item for locking, wherein said locking said call-up mechanism being carried out in response to said receiving of said information item for locking.

16. The method according to claim 1, further comprising calling up said at least one software command, said calling up being carried out following execution of said locking said call-up mechanism and receiving an information item for selection of said call-up mechanism, said information item for selection of said call-up mechanism and said information item for unlocking being received from separate portions of the data processing system.

17. The method according to claim 1, wherein said call-up mechanism comprising graphical elements shown on a screen, and a selection mechanism which selects said graphical elements.

18. A computer program comprising instructions adapted to cause a computer to implement the method according to claim 1 when said program is run on said computer.

19. A computer program comprising instructions adapted to cause a computer to implement the method according to claim 1 when said program is run on said computer.

20. An aircraft comprising the device according to claim 19.

* * * * *